March 29, 1966  C. L. KOLBE  3,243,274
METHOD OF FORMING SILICON ARTICLE
Filed March 24, 1965

Inventor:
Carl L. Kolbe,
by Paul R. Webb, II
His Attorney.

United States Patent Office 3,243,274
Patented Mar. 29, 1966

---

3,243,274
METHOD OF FORMING SILICON ARTICLE
Carl L. Kolbe, Schenectady, N.Y., assignor to General
Electric Company, a corporation of New York
Filed Mar. 24, 1965, Ser. No. 442,267
6 Claims. (Cl. 65—23)

This application is a continuation-in-part of my copending patent application Serial No. 53,639, filed September 2, 1960, now abandoned, and assigned to the same assignee as the present application.

This invention relates to methods of forming silicon articles and more particularly to methods of forming silicon articles by hot deformation.

Silicon metal is useful as a high temperature material which exhibits very good oxidation resistance properties. Since this material is brittle, neither hot deformation nor cold deformation of silicon has been feasible to date.

Pure silicon metal, which has a purity of 99.999+ percent silicon, is useful for electronic components. Development of photo-voltaic solar cells has also produced a requirement for thin silicon sheets of large area to be employed therein. Presently, pure silicon is produced by zone melting into ⅝ inch to 6 inch diameter rods. Thin wafers are cut from these rods by using diamond cutting wheels. However, this method is time consuming, wasteful of material, and limits wafer diameter to the diameter of the rod. Thus, it would be desirable to produce silicon articles including thin sheet material of predetermined shape and size by deformation.

It is an object of my invention to provide a method of forming silicon articles.

It is another object of my invention to provide a hot deformation method of forming silicon articles.

It is another object of my invention to provide a method of forming silicon articles in which a supporting material is employed.

It is a further object of my invention to provide a method of forming silicon articles in which an initial supporting material is removed readily from the deformed article.

In carrying out my invention in one form, a silicon article is formed by enclosing a silicon body in a non-reactive supporting material selected from the group consisting of graphite, molybdenum, tungsten, columbium, tantalum, chromium, rhenium, and alloys of these metals having a melting point above the working temperature of the silicon body to form a billet, heating the billet to a temperature in the range of 1100° C. to 1375° C., deforming the billet to a predetermined shape, and removing the supporting material.

These and various other objects, features, and advantages of the invention will be better understood from the following description taken in connection with the accompanying drawing in which.

Figure 1:
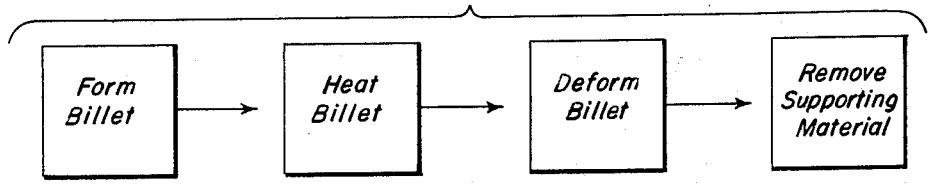
FIGURE 1 is a diagrammatic illustration of the method embodying my invention.

IN FIGURE 1 of the drawing there is shown a diagrammatic illustration of the method embodying my invention. This illustration discloses the steps of forming the billet, heating the billet, deforming the billet, and removing the supporting material.

Figure 2:
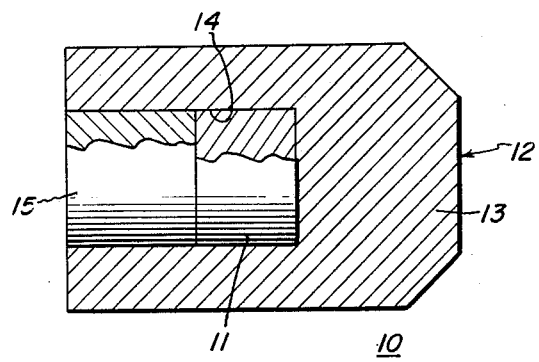
FIGURE 2 is a sectional view of a billet formed in accordance with my invention.

In FIGURE 2 of the drawing a billet is shown generally at 10 which comprises a silicon body 11 enclosed in a non-reactive supporting material 12 selected from the group consisting of graphite, molybdenum, tungsten, columbian, tantalum, chromium, rhenium, and alloys of these metals having a melting point above the working temperature of the silicon body. Supporting material 12 includes a first portion 13 with a bore 14 therein and a plug 15 closing the open end of the bore. Silicon body 11 is enclosed by first portion 13 and plug 15 of the supporting material 12.

Figure 3:
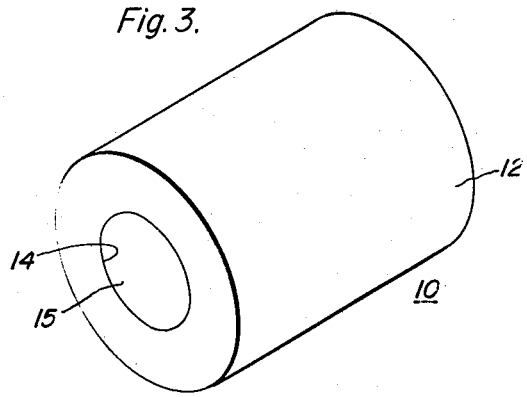
FIGURE 3 is a perspective view of the billet shown in FIGURE 2.

In FIGURE 3 of the drawing there is shown a perspective view of billet 10. At one end of supporting material 12 there is shown plug 15 which closes bore 14 to enclose body 11 (not shown) within the supporting material.

Silicon metal is not hot or cold worked because of its brittleness. I discovered that silicon could be hot deformed in a working temperature range of 1100° C. to 1375° C. if it was enclosed in a supporting material having a melting point above the working temperature of the silicon body. Furthermore, I found that it was necessary for the supporting material not to form a liquid phase or excessively alloy with the silicon. Materials which are strong enough to be employed as supporting materials for silicon at its above working temperature range are selected from the group consisting of graphite, molybdenum, tungsten, columbium, tantalum, chromium, rhenium, and alloys of these metals.

My research disclosed that the supporting material acts also as a thermal barrier to maintain the silicon at its proper working temperature. While I have found that silicon may be worked at a temperature in the range of 1100° C. to 1375° C., my preferred range is 1300° C. to 1350° C. In the preferred temperature range I have found it advantageous to work at 1325° C. Of the above materials I prefer to use molybdenum or tungsten since these materials are normally worked in the above temperature ranges, their thermal expansion are greater than silicon, and their removal from the deformed silicon body can be accomplished slowly while the silicon body is hot and more ductile to prevent cracking of the silicon articles.

In the practice of the present invention, a billet 10 is formed of a silicon body 11 enclosed in a supporting material 12 selected from the group consisting of graphite, molybdenum, tungsten, columbium, tantalum, chromium, rhenium, and alloys of these metals having a melting point above the working temperature of the silicon body so that the material is strong enough in the working temperature range of the silicon. Such material is also non-reactive with the silicon body whereby it does not form a liquid phase or excessively alloy with the silicon. The billet is heated in a furnace to a temperature in the range of 1100° C. to 1375° C. When the billet is so heated, the supporting material acts as a thermal barrier to maintain the silicon in this temperature range. The billet is then deformed to a predetermined shape by forging, extruding, rolling or a combination of forging or extruding with rolling.

While I have found that the billet may initially be heated slowly to its working temperature range, it is also possible to place the billet in a furnace already at the desired temperature. Normally, heating for ½ to ¾ hour will bring a billet of two inches diameter and two inches in length to temperature. After deformation, it is desirable to keep the billet above 1200° C. and place it in an air atmosphere furnace maintained at a temperature in excess of 550° C. and normally above 815° C. Normally a two to four hour period in such a furnace will remove the supporting material by oxidation to provide a deformed silicon article. Since the supporting material will oxidize, it is desirable to use a blower on the furnace to remove the volatile oxide. The silicon article is then cooled in the furnace to room temperature.

The supporting material of the billet may also be removed from the deformed silicon article by etching it away in a suitable pickling bath. For example, I have found that a solution of nitric acid, sulfuric acid, and water in equal parts provide a suitable bath for etching away the supporting material selected from the group consisting of molybdenum, tungsten, columbium, tantalum, chromium, and alloys of these metals. If the pickling operation is employed, the hot deformed billet is cooled slowly to room temperature prior to insertion in the pickling bath. Generally, a two to four hour period will remove all the supporting material from a billet which was initially of two inches diameter and two inches in length with no adverse effect to the silicon.

Examples of silicon articles formed in accordance with the present invention are as follows:

EXAMPLE I

A 0.750 inch diameter and a 0.4375 inch long silicon body was enclosed in a molybdenum supporting material piece having a diameter of 1.50 inches and a length of 2.0625 inches. The molybdenum piece was initially partially drilled through to provide a bore in which the silicon body was positioned. A molybdenum plug was then inserted to complete the supporting material and to form a billet, which was then heated to 1350° C. for 45 minutes in a furnace. After heating, the billet was extruded from a 2.125 inch container through a 1.0 inch diameter die. The deformed billet had a resulting length of 2.0 inches. The billet which was retained at a temperature of above approximately 1200° C. was placed in an air atmosphere furnace at a temperature of 950° C. for a period of 3 hours to remove the molybdenum by oxidation. Subsequently, the furnace was shut off and the deformed silicon article allowed to cool to room temperature.

EXAMPLE II

A silicon body having a diameter of 0.750 inch and a length of 2.0 inches was enclosed in a molybdenum supporting material piece having a diameter of 1.50 inches and a thickness of 3.125 inches. The silicon body was positioned within a bore in the molybdenum piece in a manner similar to Example I. The billet was then heated to 1350° C. for 45 minutes in a furnace. After this heating, the billet is extruded from a 2.125" container through a 0.750 inch by 1.50 inches rectangular die. The deformed billet had a resulting length of 7.0 inches. The billet was then treated in an air furnace under the same conditions as in Example I to produce a silicon article.

EXAMPLE III

A silicon body having a 0.750 inch diameter and a 0.1875 inch length was positioned in the bore of a molybdenum supporting material piece in accordance with the procedure employed in above Examples I and II. The molybdenum piece had a 1.50 inch diameter and an 0.625 inch length. The billet formed by the silicon body and the molybdenum piece was heated to 1350° C. for 30 minutes in a furnace. Subsequent to the heating, the billet was rolled and cross-rolled on a conventional rolling mill to provide a thin sheet of 0.040 inch thickness. The deformed billet was then placed in an air furnace at a temperature of 900° C. for four hours to remove the molybdenum supporting material and provide a deformed silicon sheet.

EXAMPLE IV

A billet was prepared of the same materials and sizes as the billet in Example III above. After heating to 1350° C. for 30 minutes, the billet was rolled and cross-rolled on a conventional rolling mill to provide a deformed billet having a thickness of 0.040 inch diameter. The billet was then allowed to cool to room temperature. Subsequently, the billet was placed in a pickling bath containing nitric acid, sulfuric acid, and water in equal parts for a period of four hours whereby the molybdenum supporting material was etched away to provide a deformed silicon sheet.

EXAMPLE V

A silicon body having 0.750 inch diameter and a 0.4375 inch length was prepared in accordance with the procedure of Example III. After the billet was heated at 1350° C. for 30 minutes in a furnace, it was rolled and cross-rolled in a conventional rolling mill to produce a deformed billet having a thickness of 0.065 inch. The billet was then heated in an air furnace at 1000° C. for three hours to provide a deformed silicon sheet.

Silicon articles including silicon sheet may also be produced by combining the various hot deformation operations set forth in the above examples. In producing silicon sheet the initial billet may be extruded to a predetermined shape and then rolled into sheet. Furthermore, a similar billet may be forged to a predetermined shape and then rolled into sheet material.

While other modifications of this invention and variations of the method which may be employed within the scope of the invention have not been described, the invention is intended to include all such as may be embraced within the following claims.

What I claim as new and desire to secure by Letters Patent of the United States is:

1. A method of forming a silicon article which comprises enclosing a silicon body in a non-reactive supporting material selected from the group consisting of graphite, molybdenum, tungsten, columbium, tantalum, chromium, rhenium, and alloys of these metals having a melting point above the working temperature of said silicon body to form a billet, heating said billet to a temperature in the range of 1100° C. to 1375° C., deforming said billet to a predetermined shape, and removing said supporting material.

2. A method of forming a silicon article which comprises enclosing a silicon body in a non-reactive supporting material selected from the group consisting of molybdenum, tungsten, columbium, tantalum, chromium, and alloys of these metals having a melting point above the working temperature of said silicon body to form a billet, heating said billet to a temperature in the range of 1100° C. to 1375° C., deforming said billet to a predetermined shape, and etching away said supporting material in a solution of equal parts of nitric acid, sulfuric acid and water.

3. A method of forming a silicon sheet which comprises enclosing a silicon body in a non-reactive supporting material selected from the group consisting of graphite, molybdenum, tungsten, columbium, tantalum, chromium, rhenium, and alloys of these metals having a melting point above the working temperature of said silicon body to form a billet, heating said billet to a temperature range of 1100° C. to 1375° C., deforming said billet into a sheet, and removing said supporting material.

4. A method of forming a silicon article which comprises enclosing a silicon body in a non-reactive supporting material of molybdenum having a melting point above the working temperature of said silicon body to form a billet, heating said billet to a temperature of 1350° C., deforming said billet to a predetermined shape, and removing said supporting material.

5. A method of forming a silicon sheet which comprises enclosing a silicon body in a non-reactive supporting material selected from the group consisting of graphite, molybdenum, tungsten, columbium, tantalum, chromium, rhenium, and alloys of these metals having a melting point above the working temperature of said silicon body to form a billet, heating said billet to a temperature in the range of 1100° C. to 1375° C., extruding said billet to a predetermined shape, rolling said extruded billet into a sheet, and removing said supporting material.

6. A method of forming a silicon sheet which comprises enclosing a silicon body in a non-reactive supporting material selected from the group consisting of graphite, molybdenum, tungsten, columbium, tantalum, chromium, rhenium, and alloys of these metals having a melting point above the working temperature of said silicon body to form a billet, heating said billet to a temperature in the range of 1100° C. to 1375° C., forging said billet to a predetermined shape, rolling said forged billet into a sheet, and removing said supporting material.

No references cited.

DONALL H. SYLVESTER, *Primary Examiner.*

D. CRUPAIN, *Assistant Examiner.*